United States Patent
Wenig et al.

(10) Patent No.: US 10,693,832 B1
(45) Date of Patent: Jun. 23, 2020

(54) ADDRESS RESOLUTION PROTOCOL OPERATION IN A FIBRE CHANNEL FABRIC

(71) Applicant: AVAGO TECHNOLOGIES INTERNATIONAL SALES PTE. LIMITED, Singapore (SG)

(72) Inventors: Glenn Wenig, Pleasanton, CA (US); Daniel Chung, San Jose, CA (US); Jesse Willeke, Broomfield, CO (US)

(73) Assignee: AVAGO TECHNOLOGIES INTERNATIONAL SALES PTE. LIMITED, Singapore (SG)

( * ) Notice: Subject to any disclaimer, the term of this patent is extended or adjusted under 35 U.S.C. 154(b) by 713 days.

(21) Appl. No.: 15/299,734

(22) Filed: Oct. 21, 2016

Related U.S. Application Data

(60) Provisional application No. 62/272,810, filed on Dec. 30, 2015.

(51) Int. Cl.
| | |
|---|---|
| G06F 15/16 | (2006.01) |
| H04L 29/12 | (2006.01) |
| H04L 12/46 | (2006.01) |
| H04L 12/931 | (2013.01) |

(52) U.S. Cl.
CPC ........ H04L 61/103 (2013.01); H04L 12/4633 (2013.01); H04L 49/357 (2013.01)

(58) Field of Classification Search
CPC .. H04L 61/103; H04L 12/4633; H04L 49/357
USPC .......................................... 709/245; 398/45
See application file for complete search history.

(56) References Cited

U.S. PATENT DOCUMENTS

| | | | |
|---|---|---|---|
| 7,120,728 B2 | 10/2006 | Krakirian et al. | |
| 7,752,361 B2 | 7/2010 | Rangan et al. | |
| 8,320,241 B2 | 11/2012 | Chen et al. | |
| 8,599,847 B2 | 12/2013 | Pathak et al. | |

(Continued)

OTHER PUBLICATIONS

Y. Li, D. Eastlake, L. Dunbar, R. Perlman, I. Gashinsky; TRILL: ARP/ND Optimization; draft-ietf-trill-arp-optimization-01; IETF; Oct. 14, 2015; pp. 1-10.

(Continued)

*Primary Examiner* — David R Lazaro
*Assistant Examiner* — Mariegeorges A Henry
(74) *Attorney, Agent, or Firm* — Xsensus LLP

(57) ABSTRACT

A network where FC and Ethernet storage traffic share the network. The network extends FC SAN storage attributes to Ethernet storage devices. The network is preferably formed of FC switches, so each edge switch acts as an FCoE FCF, with internal communications done using FC. IP packets are encapsulated in FC packets for transport. Preferably, either each outward facing switch port can be configured as an Ethernet or FC port, so devices can be connected as desired. Ethernet addresses of IP devices are discovered based on ARP requests and lookup misses. Once an ARP request is trapped, the source device's information is added to a local database and distributed within the network. If the destination device is not known, a network-specific fabric protocol is used to propagate the ARP request to the other switches. An ARP response is processed similarly to update the local database and to distribute the update.

11 Claims, 16 Drawing Sheets

(56) References Cited

U.S. PATENT DOCUMENTS

| | | | |
|---|---|---|---|
| 8,694,654 B1* | 4/2014 | Kalusivalingam | ............................ H04L 41/0806 370/389 |
| 2011/0268120 A1 | 11/2011 | Vobbilisetty et al. | |
| 2011/0268125 A1 | 11/2011 | Vobbilisetty et al. | |
| 2011/0286357 A1 | 11/2011 | Haris et al. | |
| 2011/0292947 A1 | 12/2011 | Vobbilisetty et al. | |
| 2011/0299391 A1 | 12/2011 | Vobbilisetty et al. | |
| 2011/0299535 A1 | 12/2011 | Vobbilisetty et al. | |
| 2012/0308232 A1* | 12/2012 | Eisenhauer | ............ H04L 49/357 398/45 |
| 2014/0269745 A1 | 9/2014 | Johnson et al. | |
| 2014/0301402 A1 | 10/2014 | Wenig et al. | |
| 2015/0071122 A1* | 3/2015 | Addanki | ............. H04L 41/0886 370/255 |
| 2017/0155599 A1* | 6/2017 | Vobbilisetty | ......... H04L 12/4625 |

OTHER PUBLICATIONS

Y. Li, L. Dunbar, R. Perlman; TRILL: ARP/ND Optimization; draft-ieff-trill-arp-optimization-06; IETF; Apr. 23, 2016; pp. 1-10.

* cited by examiner

ADDRESS RESOLUTION PROTOCOL OPERATION IN A FIBRE CHANNEL FABRIC

CROSS REFERENCE TO RELATED APPLICATIONS

This application claims the benefit under 35 U.S.C. § 119(e) of U.S. Provisional Patent Application Ser. No. 62/272,810 entitled "Address Resolution Protocol Operation in a Fibre Channel Fabric," filed Dec. 30, 2015, which is hereby incorporated by reference in its entirety.

This application is related to U.S. patent applications Ser. No. 15/299,741, entitled "Automatic Zoning of Virtual Local Area. Networks in a Fibre Channel Fabric;" Ser. No. 15/299,756, entitled "Soft Zoning of Virtual Local Area Networks in a Fibre Channel Fabric;" and Ser. No. 15/299, 767, entitled "Hard Zoning of Virtual Local Area Networks in a Fibre Channel Fabric," all of which are filed concurrently herewith and are hereby incorporated by reference as if reproduced in their entireties.

BACKGROUND OF THE INVENTION

1. Field of the Invention

The invention relates to network switches and routers.

2. Description of the Related Art

Storage networking is becoming ever more complicated. Storage area networks (SANs) are used for block-level storage of data. File area networks (FANs) are used for file-level storage of data. FANs are commonly formed using Internet Protocol (IP) addressing on an Ethernet network or local area network (IAN) and the storage units are referred to as Network Attached Storage (NAS) units. SANs are commonly formed in several different ways. First, the Internet Small Computer System Interface (iSCSI) protocol, which is based on IP and Transmission Control Protocol (TCP), can be used over Ethernet networks. Second, the SAN can use Fibre Channel (FC) links and a fabric. Third, the SAN can be formed using the Fibre Channel over Ethernet (FCoE) protocol, which may be all over Ethernet or combined with an FC fabric and devices. As shown in FIGS. 1 and 2, two options for the storage units have been developed. In FIG. 1 NAS storage unit 102 and iSCSI storage unit 104 are connected to a LAN 106 and share the LAN 106 with all other LAN-connected devices. FC storage units 108, 110, 112 are connected to an FC SAN 114. Each server 116 includes a network interface card (NIC) 118 to connect to the LAN 106 and a host bus adapter (HBA) 120 to connect to the SAN 114. The LAN 106 and the SAN 114 are connected to a wide area network (WAN) or the Internet 122 to allow external communication. In FIG. 2 NAS storage unit 102 and iSCSI storage units 104, 124 have been placed on their own dedicated IP storage network 126. In some embodiments, an additional NIC 128 is provided to connect to the IP storage network 126 to avoid mixing LAN traffic and IP storage traffic even at the top of rack (TOR). In FIG. 1 traffic quality and security is compromised as IP storage traffic and general IP traffic share the same LAN 106, while FIG. 2 adds complexity by adding the IP storage network 126 and a second NIC 128. Further, there are potential administrative issues that may result between storage administrators and network administrators in the various configurations.

SUMMARY OF THE INVENTION

A network according to the present invention provides a Unified Storage Fabric (USF), which is a network where FC and Ethernet storage traffic share the underlying network, which is optimized for storage traffic. USF extends FC SAN storage specific attributes—high performance, lossless, equal cost multi-path (ECMP) routing, storage specific analytics, etc.—to Ethernet storage devices. As the USF is preferably formed of FC switches, each edge USF switch acts as an FCoE Fibre Channel Forwarder (FCF) for FCoE operations, with internal communications done using FC. IP packets are encapsulated in FC packets for transport through the USF. Preferably each outward facing or edge USF port on a USF switch can be configured as either an Ethernet port or a FC port, so devices can be connected as desired.

The Ethernet addresses of IP devices are discovered within USF based on Address Resolution Protocol (ARP) requests and lookup misses. Generally, once an ARP request is trapped to a switch CPU, the generating device's information is added to a local database and distributed within the USF. If the destination device is not known by the switch, a USF-specific fabric protocol is used to propagate the ARP request to the other USF switches to discover a destination device. An ARP response is processed similarly to update the local database and to distribute the update within the USF.

BRIEF DESCRIPTION OF THE FIGURES

The accompanying drawings, which are incorporated in and constitute a part of this specification, illustrate an implementation of apparatus and methods consistent with the present invention and, together with the detailed description, serve to explain advantages and principles consistent with the invention.

DETAILED DESCRIPTION OF THE PREFERRED EMBODIMENTS

A network according to the present invention provides a Unified Storage Fabric (USF), which is a network where FC and Ethernet storage traffic share the underlying network, which is optimized for storage traffic. The USF extends FC SAN storage specific attributes—high performance, lossless, ECMP, storage specific analytics, etc.—to Ethernet storage devices.

Generally a USF:

Supports FC and Ethernet based storage protocols on a Fibre Channel-based switch.

Provides an isolated storage fabric separate from a data network.

Supports IP storage protocols. Generally, iSCSI and NAS, most commonly Server Message Block (SMB)/Common Internet File System (CIFS) and Network File System (NFS), fall into this category. However, any future storage protocols that work on a generic IP network can also be supported.

Within this document, "Ethernet storage protocol" generally refers to FCoE, iSCSI and NAS, while "IP storage protocol" generally refers to iSCSI and NAS.

Supports FCoE and IP-based storage protocol within the same fabric.

Supports RDMA over converged Ethernet (RoCE) and internet wide area RDMA protocol (iWARP) for Ethernet.

Provides L2 and L3 TOR connectivity.

Supports Ethernet storage protocols across subnets. i.e. hosts and storage units in different subnets.

Supports Ethernet storage protocols in addition to FC protocol without affecting the FC protocol adversely.

Integrates seamlessly into an existing Ethernet infrastructure.

Generally minimizes Ethernet features to provide simplified Ethernet storage fabric management and topology.

Figure 1:
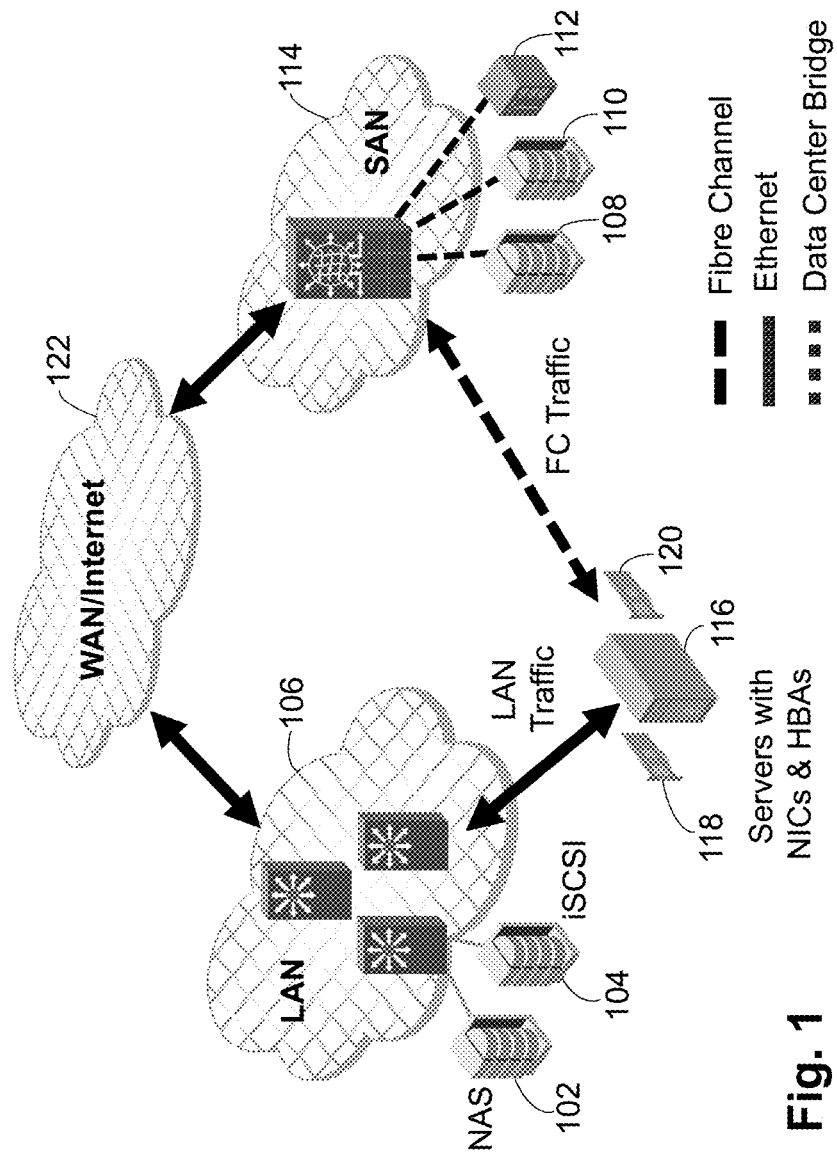
FIG. 1 is a block diagram of a first embodiment of a prior art network.
Figure 2:
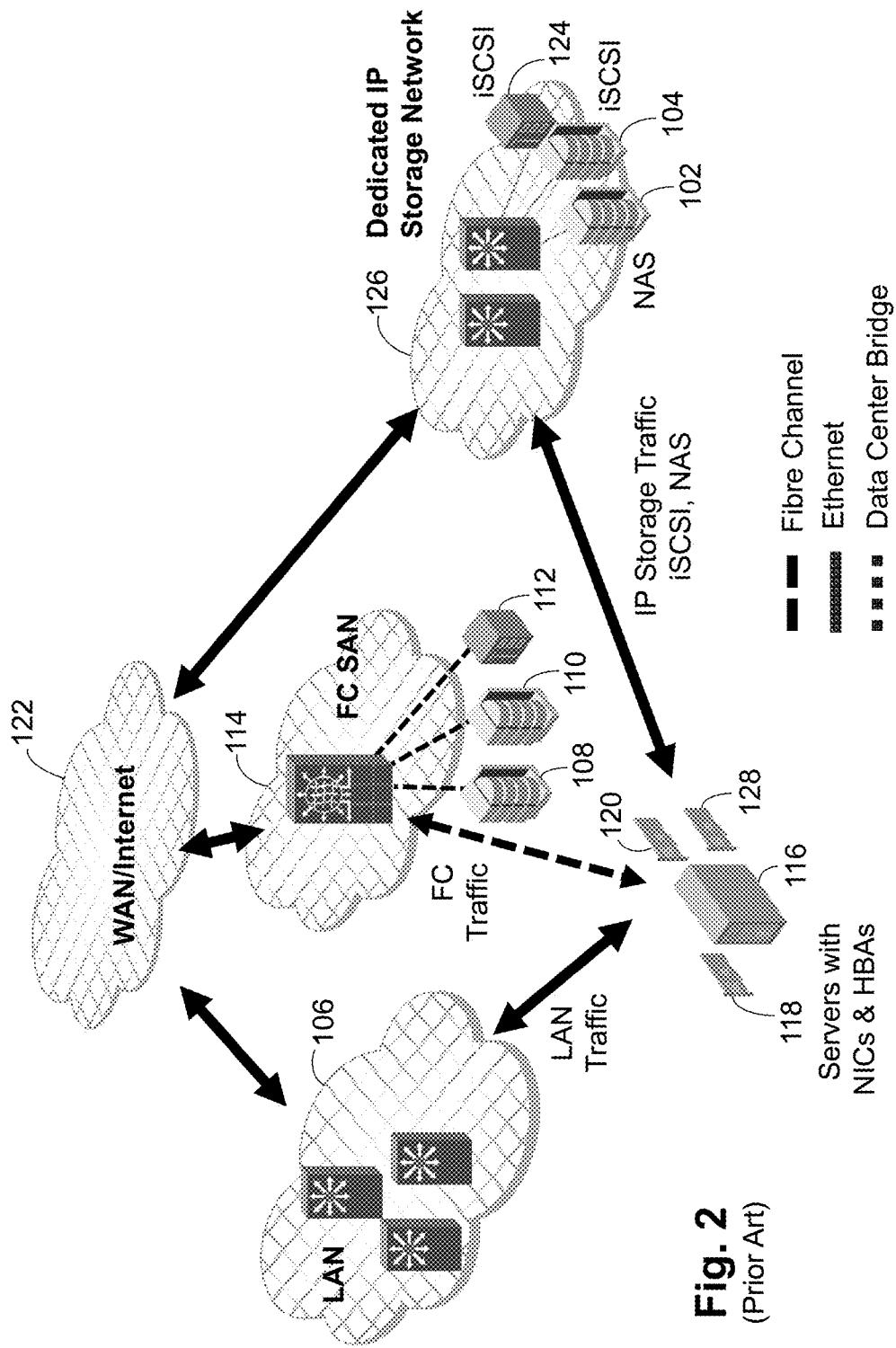
FIG. 2 is a block diagram of a second embodiment of a prior art network.
Figure 3:
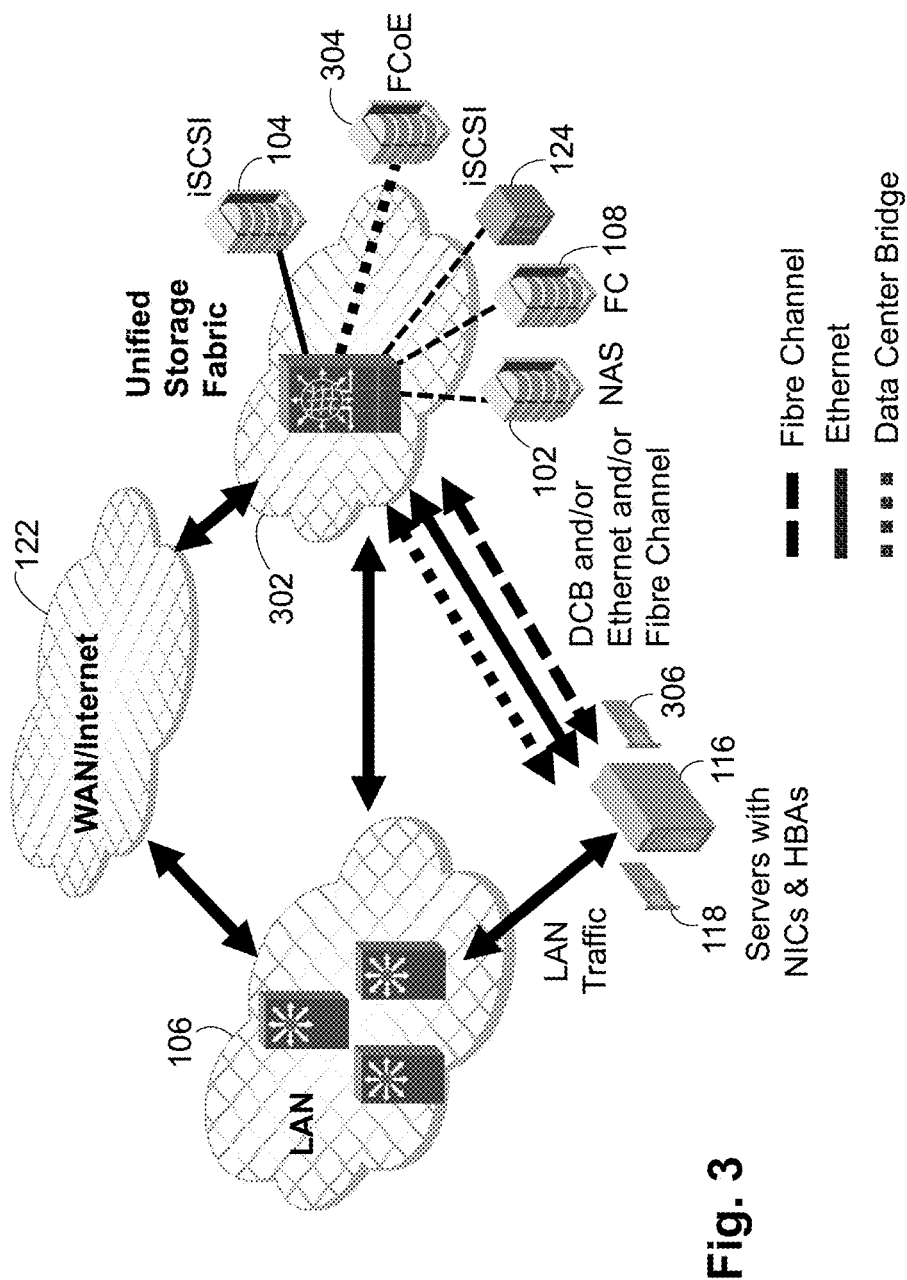
FIG. 3 is a block diagram of a first embodiment of a network according to the present invention.

A USF allows all storage protocols to coexist within a single storage optimized fabric. For example, see FIGS. 3 and 4. In FIG. 3, a USF 302 has attached a NAS storage unit 102, iSCSI storage units 104, 124, FC storage unit 108 and an FCoE storage unit 304.

The server 116 has an adapter or adapters 306 as needed for the various protocols. For example, an HBA is needed for FC communications but a converged network adapter (CNA) or a NIC can be used for iSCSI, NAS and FCoE communications. A single NIC that can use different VLANs to separate the iSCSI, NAS and FCoE packets can be used instead of having a separate NIC for each protocol. There are as many links as needed between the server 116 and the USF 302 to accommodate the desired protocols.

Figure 4:
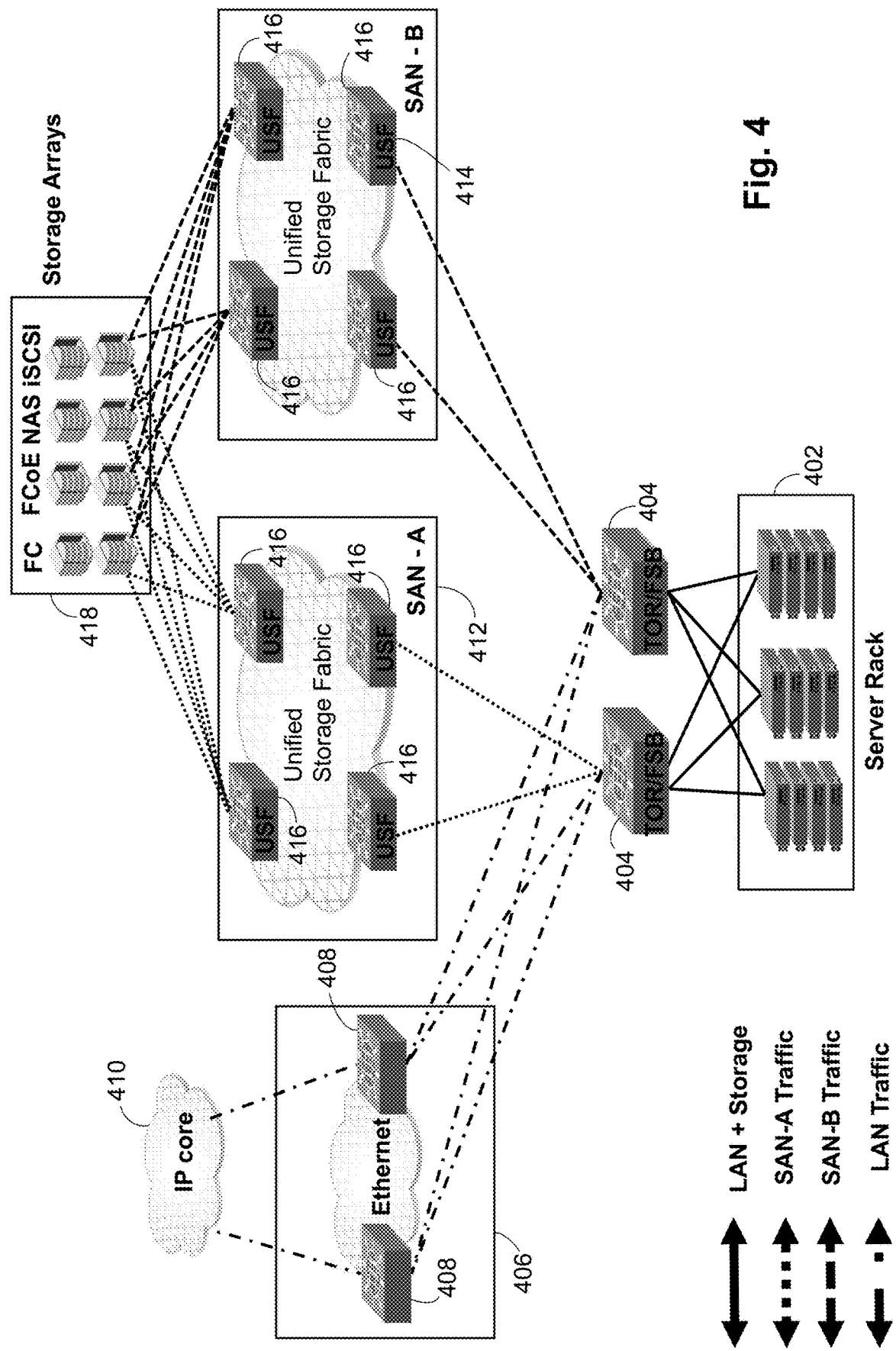
FIG. 4 is a block diagram of a second embodiment of a network according to the present invention.

FIG. 4 is an alternate embodiment configured for redundancy of the USF. Conventional storage units and HBAs, NICs and CNAs include two ports to allow connection to redundant fabrics. The use of multipath techniques allows continued communication even if a single fabric fails. In the embodiment of FIG. 4, all communications from the servers is done using Ethernet, so FCoE is used with FC storage units. A plurality of servers are contained in a server rack 402. The server rack 402 has two TOR/FIP snooping bridge (FSB) switches 404, so that each server is connected to each TOR/FSB switch 404. Each TOR/FSB switch 404 is connected to an Ethernet switch 408 in a LAN 406. The switches 408 connect to an IP core 410, such as the Internet or another LAN. There are two parallel, redundant SANs, SAN A 412 and SAN B 414. Each SAN A 412 and SAN B 414 is a USF formed of a series of USF switches 416. Each TOR/FSB switch 404 is connected to two USF switches 416 in one of SAN A 412 or SAN B 414. Each of SAN A 412 and SAN B 414 has two USF switches 416 connected to each storage unit in the storage array 418. This configuration provides redundancy at the SAN level and inside each SAN. The TOR/FSB switch 404 splits the traffic into general data network vs. USF.

This configuration allows for data vs. storage Ethernet traffic segregation that both network and storage admins are looking for and yet minimizes the number of NICs needed in each server.

Figure 5:
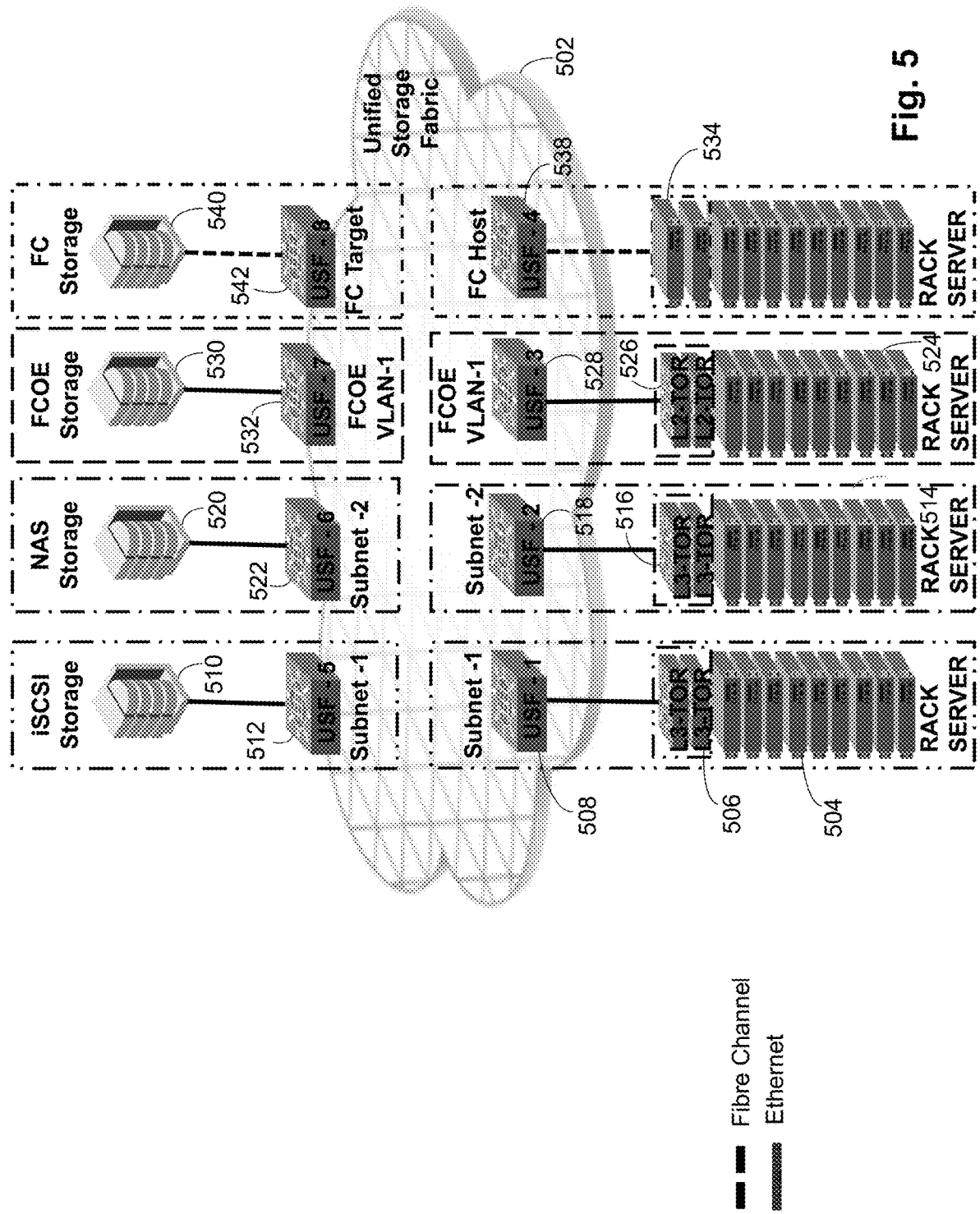
FIG. 5 is a block diagram of a third embodiment of a network according to the present invention.

However, even though all storage protocols are sharing the same underlying network, a USF does not provide protocol mapping or bridging. In other words, a host or server using a specific storage protocol generally remains bound to a target that is using the same storage protocol. See generally FIG. 5. FIG. 5 illustrates four different storage protocols, iSCSI, NAS, FCoE and FC. USF 502 includes subnet 1, which has rack servers 504 and related TOR Switches 506 connected to USF switch 1 508 and has iSCSI storage unit 510 connected to USF switch 5 512. USF 502 includes subnet 2, which has rack servers 514 and related TOR switches 516 connected to USF switch 2 518 and NAS storage unit 520 connected to USF switch 6 522. USF 502 includes FCoE VLAN 1, which has rack servers 524 and related TOR switches 526 connected to USF switch 3 528 and FCoE storage unit 530 connected to USF switch 7 532. Finally, rack servers 534 are connected to USF switch 4 538 using FC and FC storage unit 540 is connected to USF switch 8 542 using FC. Rack servers 504 in subnet 1 cannot communicate with NAS storage 520 in subnet 2, for example, as that is crossing from an iSCSI protocol boundary to a NAS protocol boundary. This configuration is conceptual, as a given server or host may use FCoE, iSCSI and NAS protocols all at the same time. In FIG. 5 the server is then considered as being in subnet 1 for iSCSI, subnet 2 for NAS and FCoE VLAN 1 for FCoE. Thus, each communication is bounded to targets that specifically speak the protocol.

The only exception to these protocol boundaries is FCoE, where hosts using the FCoE protocol can communicate with an FCoE target or an FC target, and vice versa.

This is due to the nature of FCoE, where it was created to map FC on an Ethernet infrastructure.

The allowed communication matrix within a USF is:
FC host<->FC target
FC host<->FCoE target
FCoE host<->FCoE target
FCoE host<->FC target
iSCSI host<->iSCSI target
NAS host<->NAS target As the USF is preferably internally formed of FC switches, each edge USF switch acts as an FCoE FCF for FCoE operations, with internal communications done using FC.

Figure 6:
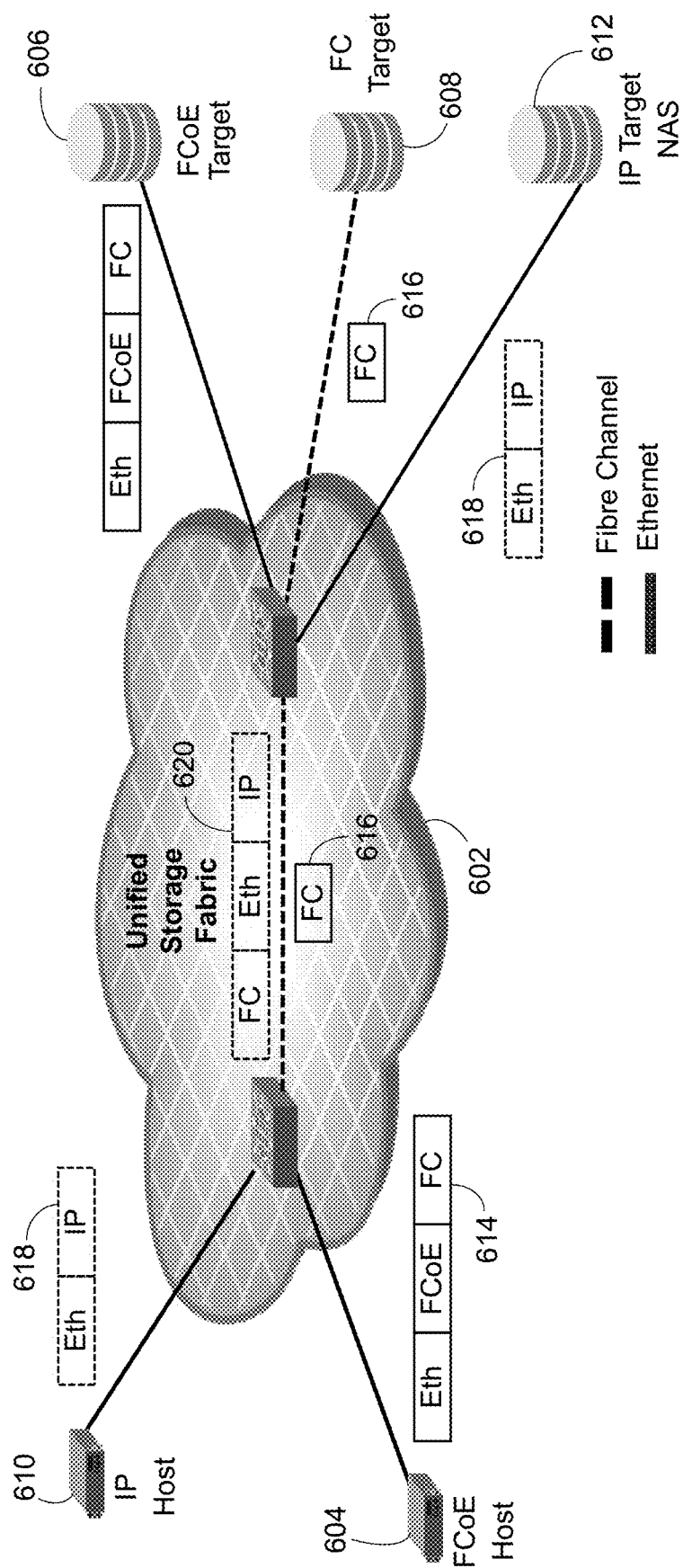
FIG. 6 is a first block diagram of a network according to the present invention illustrating packet flow for FCoE devices and for IP devices.

Referring to FIG. 6, FCoE and IP storage packet flow is illustrated. A USF 602 has connected an FCoE host 604, an FCoE target 606, an FC target 608, an IP host 610 and an IP target 612, such as a NAS storage unit. The FCoE host 604 provides an FCoE packet 614 to the USF 602. The FCoE packet 614 has an Ethernet header with an FCoE Ethertype and an encapsulated FC packet. The USF 602 removes the Ethernet header and transmits the FC packet 616 internally in the USF. When exiting the USF 602 to the FCoE target 606, an FCoE frame with an Ethernet header with an FCoE Ethertype and the FC packet are sent to the FCoE target 606. If the FC target 608 is the destination, the FC packet is simply provided from the USF 602 to the FC target 608. The IP host 610 provides an Ethernet packet 618 with an IP payload, typically a TCP/IP payload, for use with the IP target 612. The USF 602 encapsulates the Ethernet packet 618 in an FC packet 620, which is routed through the USF 602. The Ethernet packet 618 is recovered and provided to the IP target 612.

Figure 7:
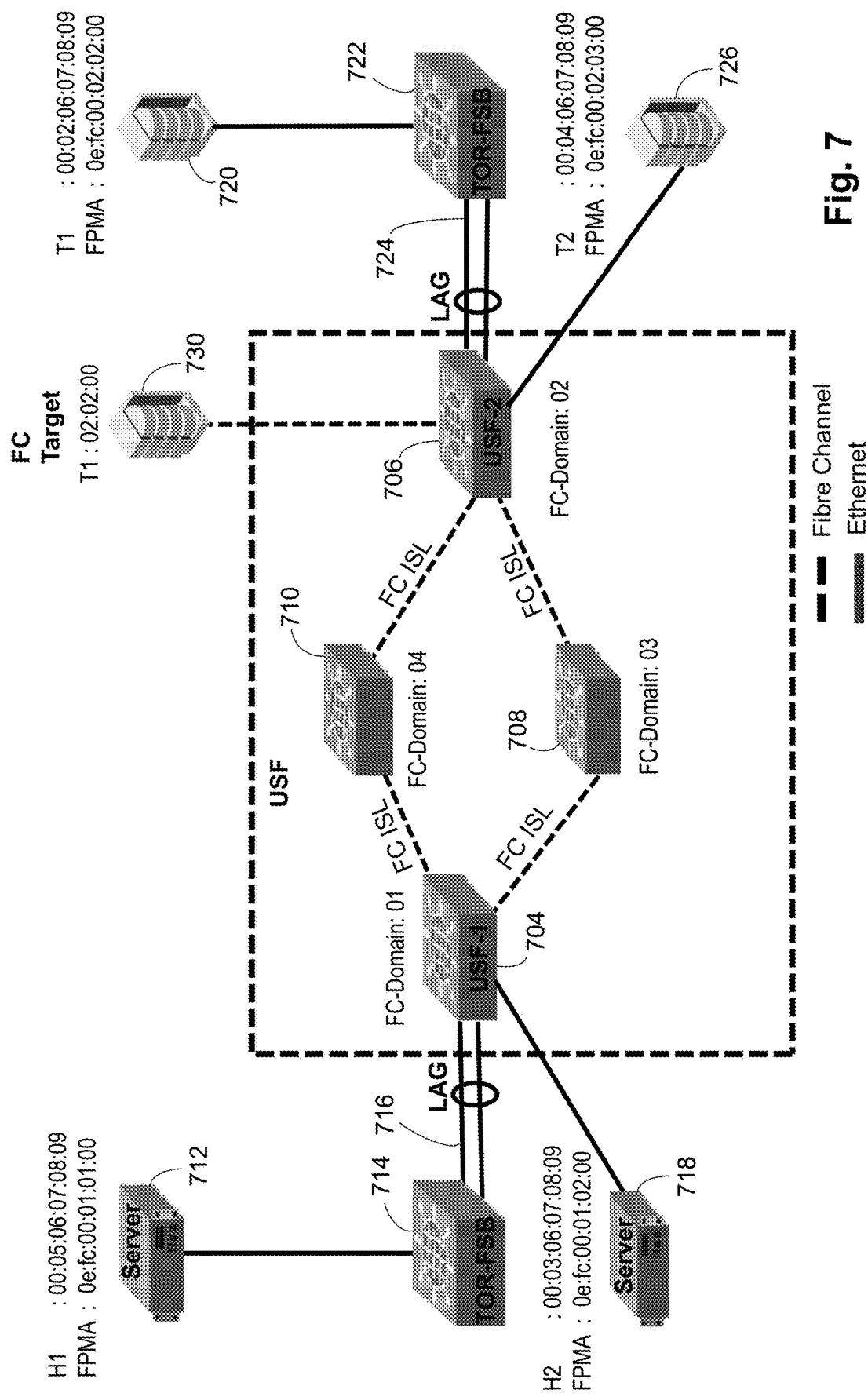
FIG. 7 is a second block diagram of a network according to the present invention illustrating packet flow for FCoE devices and between an FC device and an FCoE device.

FIG. 7 is an alternate embodiment illustrating the various Ethernet connections that are used with a USF. A USF 702 includes for USF switches 704, 706, 708, 710. As each USF switch has a FC back end, each USF switch also has an FC domain value. In the illustrated embodiment, USF switch 704 is domain 01, USF switch 706 is domain 02, USF switch 708 is domain 03 and USF switch 710 is domain 04. The USF switches 704, 706, 708, 710 are interconnected using FC interswitch links (ISLs). A server 712 having a native MAC address and a fabric provided MAC address (FPMA), as FCoE operations are being performed, is connected to a TOR/FSB switch 714. The TOR/FSB switch 714 is connected to the USF switch 704 using a link aggregation group (LAG) 716 for increased bandwidth. A second server 718 having a native MAC address and an FPMA is directly connected to the USF switch 704.

An FCoE storage unit 720 having a native MAC address and an FPMA is connected to a TOR/FSB switch 722. The TOR/FSB switch 7224 is connected to the USF switch 706 using a LAG 724. A second FCoE storage unit 726 having a native MAC address and an FPMA is directly connected to the USF switch 706. An FC storage unit 730 is directly connected to the USF switch 706.

In this embodiment only FCoE packets are being provided from the servers 712, 718, so the FCoE packets are received at USF switch 704, converted to FC packets, transmitted through the USF 702 to USF switch 706 and then converted back to FCoE packets if going to the FCoE storage units 720 or 726 or remaining as an FC packet if going to FC storage unit 730.

The above embodiments have shown both Ethernet and FC connections on a USF switch. Preferably, each outward facing or edge USF port on a USF switch is configurable as either an Ethernet port or an FC port, so devices can be connected as desired.

Figure 8:
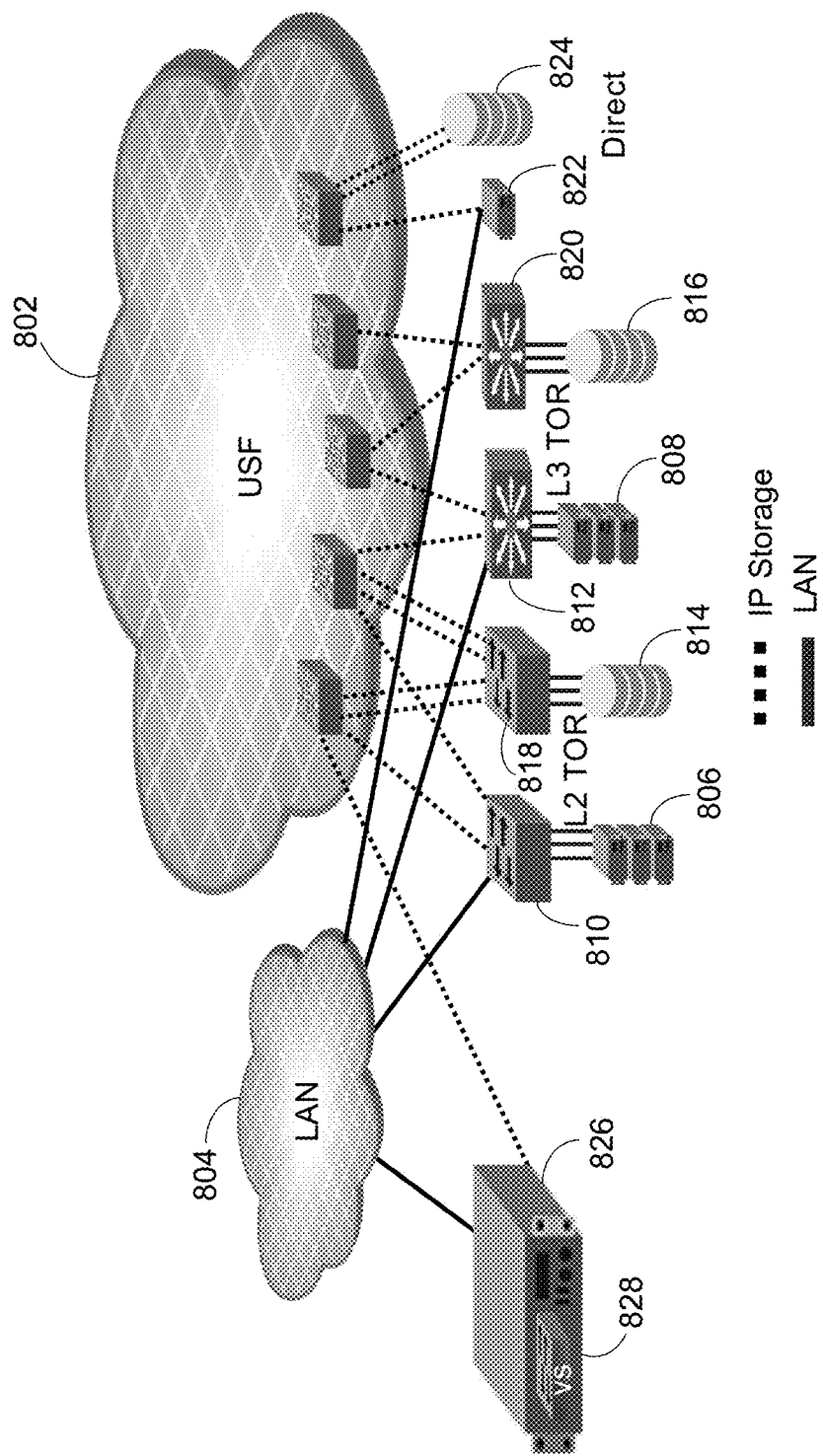
FIG. 8 is a block diagram of a network according to the present invention illustrating IP connection options and separation of storage and LAN traffic.

FIG. 8 provides an embodiment illustrating the various methods of connecting Ethernet servers/hosts and storage units. A USF 802 and a LAN 804 are shown. Hosts 806, 808 using Ethernet storage are most likely to connect to the USF 802 through an L2 TOR 810 or an L3 TOR 812. Ethernet storage units 814, 816, such as FCoE storage, iSCSI storage, or NAS storage, connect to the USF 802 through an L2 TOR 818 or an L3 TOR 820. Ethernet ports on these storage units 814, 816 most likely wholly belong to storage VLANs. These devices will directly communicate with hosts if belonging to the same TOR. They also communicate with hosts through the USF.

Hosts 822 connect to the USF 802 directly. In this case, the host 822 normally uses two separate Ethernet ports to directly split data vs. USF at the host level. Ethernet storage units 824 normally connect to the USF 802 directly. Ethernet ports on these storage units 824 normally connect to the USF 802 only.

A virtualization server 826 running a hypervisor and having a virtual switch 828 is shown as also directly connecting to the LAN 804 and the USF 802, like the hosts 822.

IP addresses are assigned to USF-connected devices through static or dynamic methods. The USF does not dictate a particular IP address assignment model and the USF does not rely on the model for discovery and routing. However, the USF does provide helper functions to aid in the dynamic model.

IP devices connected to the USF must have a valid IP address and an appropriate subnet mask. These IP addresses can be statically assigned to IP devices through a customer specific process or orchestration application such as vCenter™. If the device is expected to communicate outside of the resident subnet, a Gateway IP address is also provided.

When IP devices are assigned IP addresses through dynamic means, Dynamic Host Configuration Protocol (DHCP) protocol is used. In preferred embodiments, the USF does not provide native DHCP service but instead provides a DHCP relay service that allows IP devices to communicate with the customer's own DHCP server. When a DHCP request is received by a USF switch, the request is relayed to the customer's DHCP server through a management Ethernet port on a switch's front panel. This model assumes that the management Ethernet port is likely to be on the general data network with easy access to the customer's DHCP server.

When an IP device is resolving an IP address of a remote device to human readable host name, domain name system (DNS) is used. Preferably, the USF does not provide a native DNS service but does provide a DNS forwarder service that allows IP devices to communicate with the customer's own DNS server. When a DNS request is received by a USF switch, the request is forwarded to the customer's DNS server through a management Ethernet port on switch's front panel.

Figure 10:
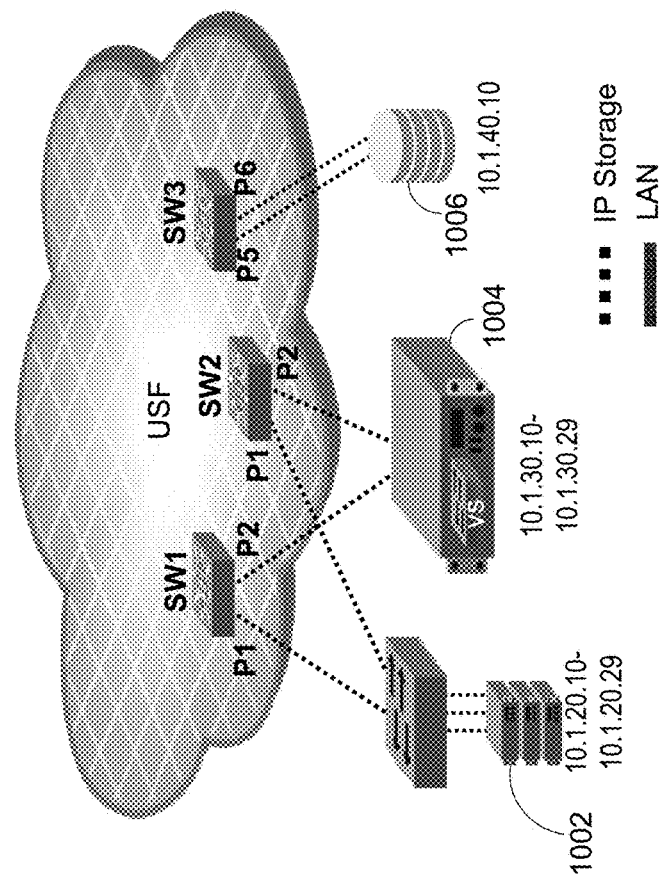
FIG. 10 is a second block diagram of a network according to the present invention illustrating network provisioning.
Figure 9:
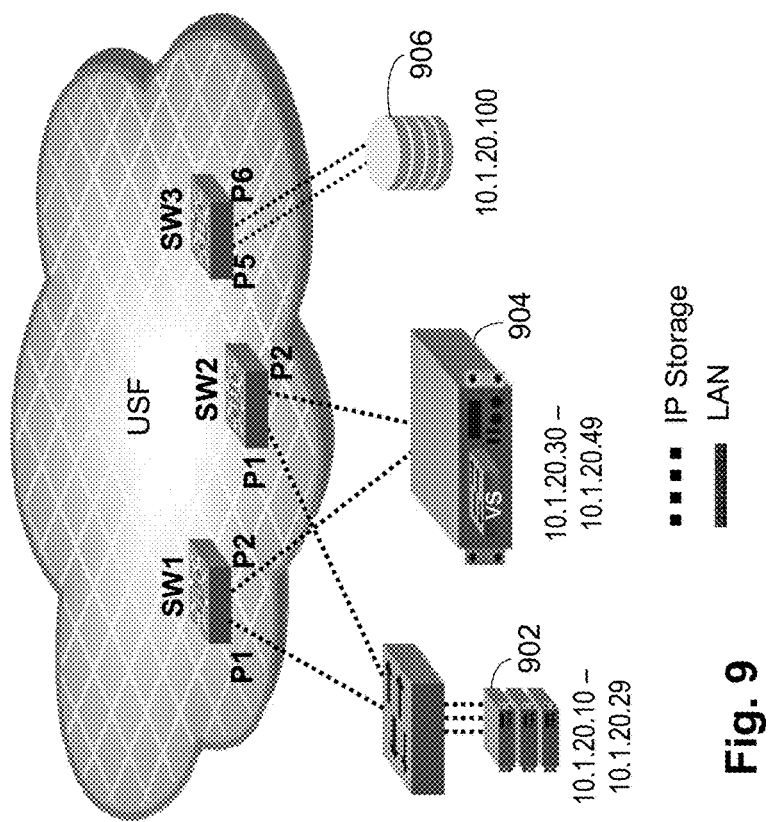
FIG. 9 is a first block diagram of a network according to the present invention illustrating network provisioning.
Figure 11:
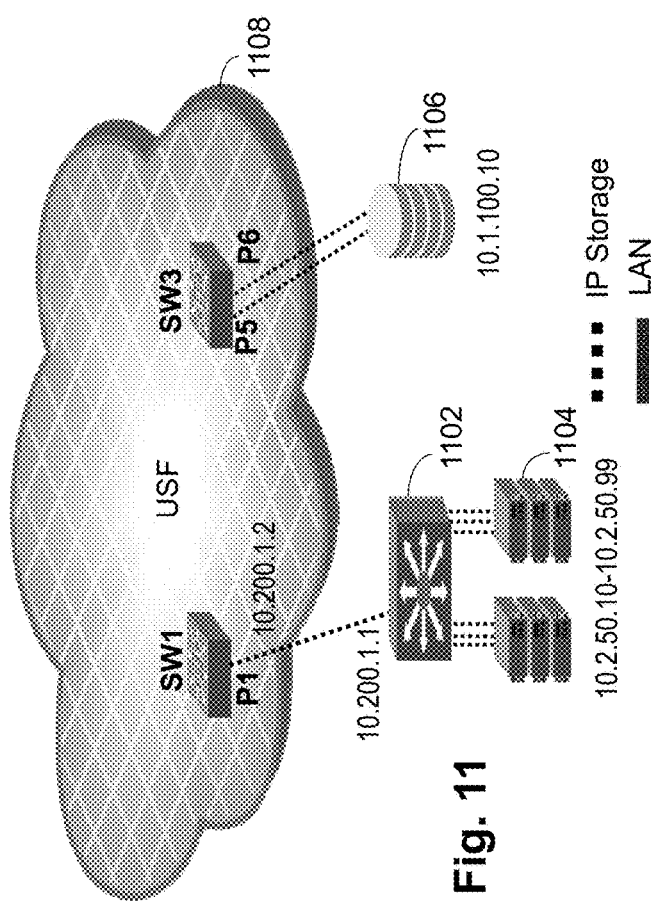
FIG. 11*i* is a third block diagram of a network according to the present invention illustrating network provisioning.

Various combinations of IP addresses are shown in FIGS. 9-11. In FIG. 9, the servers 902, the virtualization server 904 and the storage unit 906 are all in a single /24 subnet, in the illustrated case the 10.1.20 subnet. In FIG. 10, the servers 1002, the virtualization server 1004 and the storage unit 1006 are all in different /24 subnets, the 10.1.20, 10.1.30 and 10.1.40 subnets, respectively. In FIG. 11, an L3 TOR switch 1102 is present, with servers 1104 connected to the L3 TOR switch 1102. A storage unit 1106 is directly connected to the USF 1108. The L3 TOR switch 1102, the servers 1104 and the storage unit 1106 are on different /16 subnets, the L3 TOR switch 1102 on 10.200.1, the servers 1106 on 10.2.50 and the storage unit 1106 on 10.1.100. The USF 11o8 is configured to route between the 10.1.100 and 10.200.1 addresses, while the L3 TOR switch 1102 is configured to route between the 10.200.1 and 10.2.50 addresses.

As can be seen, the address assignments and routing in the various embodiments is very flexible.

Figure 12:
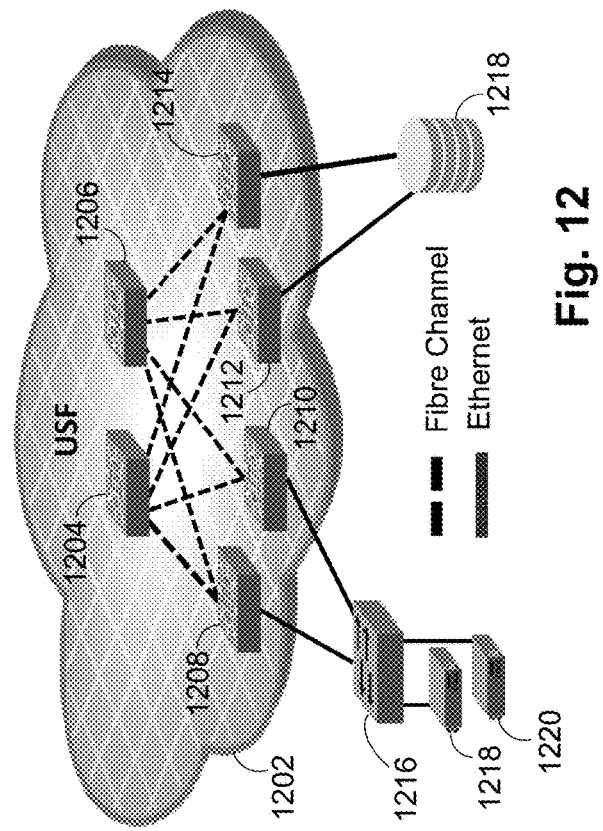
FIG. 12 is a block diagram of a network according to the present invention illustrating redundancy and multi-pathing.

FIG. 12 illustrates redundancy and multi-pathing performed in a USF according to a preferred embodiment. A USF 1202 is formed by USF switches 1204, 1206, 1208, 1210, 1212, 1214, where USF switches 1204, 1206 are connected to each of USF switches 1208, 1210, 1212, 1214. A storage unit 1218 is connected to USF switches 1212, 1214. An L2 switch 1216 is connected to USF switches 1208, 1210. Servers 1220 are connected to the L2 switch 1216. In this configuration, there are two paths from the L2 switch 1216 to the storage unit 1218, providing good redundancy and multi-pathing.

Figure 13:
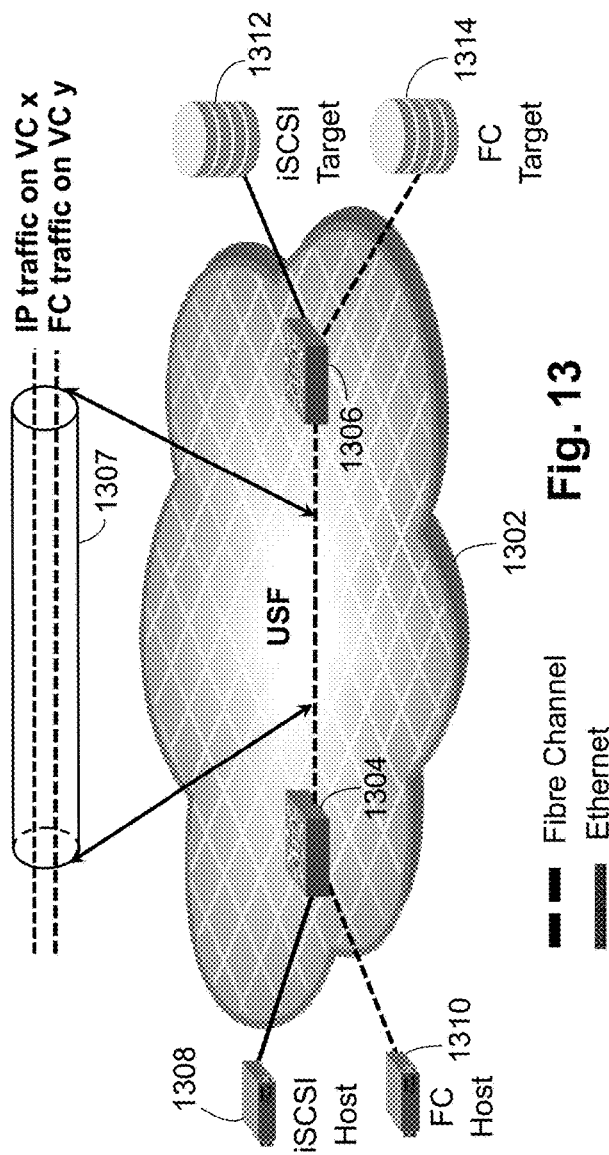
FIG. 13 is a block diagram of a network according to the present invention illustrating traffic isolation in the USF network.

FIG. 13 illustrates that different virtual channels (VCs) are used on the FC ISLs (inter-switch links) to provide traffic isolation in the FC fabric of a USF. A USF 1302 has two connected USF switches 1304, 1306. The USF switches 1304, 1306 are connected by an FC ISL 1307. As is well known, FC ISLs have a series of virtual channels (VCs) used to separate flows. In the preferred embodiments, IP traffic and FC traffic are carried on different VCs for traffic isolation. An iSCSI host 1308 and an FC host 1310 are connected to USF switch 1304, while an iSCSI target 1312 and an FC target 1314 are connected to USF switch 1306. Thus, the flow from the iSCSI host 1308 to the iSCSI target 1312 travels on a different VC from the flow from the FC host 1310 to the FC target 1314.

Discovery of Ethernet Devices within USF

IP devices are discovered within a USF based on the Address Resolution Protocol (ARP) and lookup misses. Generally, once an ARP request is trapped to the receiving USF switch CPU, the source device's information is added to a local database and distributed within the USF using a USF-specific protocol. If the destination device is not known by the USF switch, a USF-specific fabric protocol is used to propagate the ARP request to the other USF switches to discover a destination device. An ARP response is processed similarly to update the local database and to distribute the update within the USF.

FCoE devices, on the other hand, use a registration process where the device explicitly logins to the fabric using the FCoE Initiation Protocol (FIP) protocol. Therefore, a host using IP storage protocol and FCoE may be seen by the USF through multiple means.

An Ethernet frame arriving at a USF must have one of the following EtherTypes. Some types are marked to forward to the receiving USF switch CPU, while others are marked to proceed with normal data frame processing. Frame marked with other EtherTypes are dropped.

IPv4—normal data processing
ARP—trap to CPU
IPv6—normal data processing
LLDP—trap to CPU
FCoE—normal data processing
FIP—trap to CPU In addition, Ethernet frames marked as broadcast are trapped to the CPU.

Figure 14:
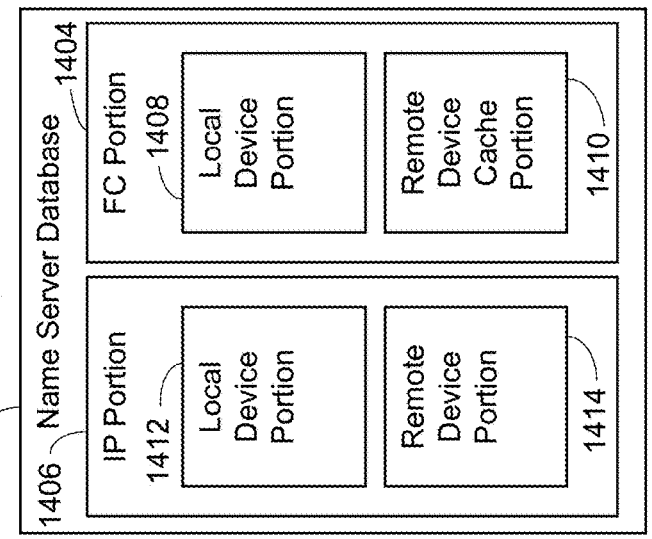
FIG. 14 is a block diagram of a name server database of a switch in a network according to the present invention.

As IP frames are being transmitted over an FC fabric, certain IP Fabric Services must be provided to supplement the normal FC fabric services. Gateway Services is a fabric service that is responsible for maintaining a database that keeps track of all the IP devices that are present in a USF. Local devices are kept in local portion of the database while remote devices are kept in remote cache portion of the database. As a whole, every domain knows about all the L2 devices within the USF. FIG. 14 is a block diagram of a Name Server database 1402. The database 1402 has two portions, a conventional FC portion 1404 and an added IP portion 1406. The FC portion has two components, a local device portion 1408 and a remote device cached portion 1410. These portions 1408, 1410 are developed as described in U.S. Pat. No. 8,599,847, which is hereby incorporated by reference. Similarly, the IP portion 1406 has two portions, a local device portion 1412 and a remote device portion 1414. Development of the entries in the IP portion 14o6 is described below in more detail.

Figure 15:
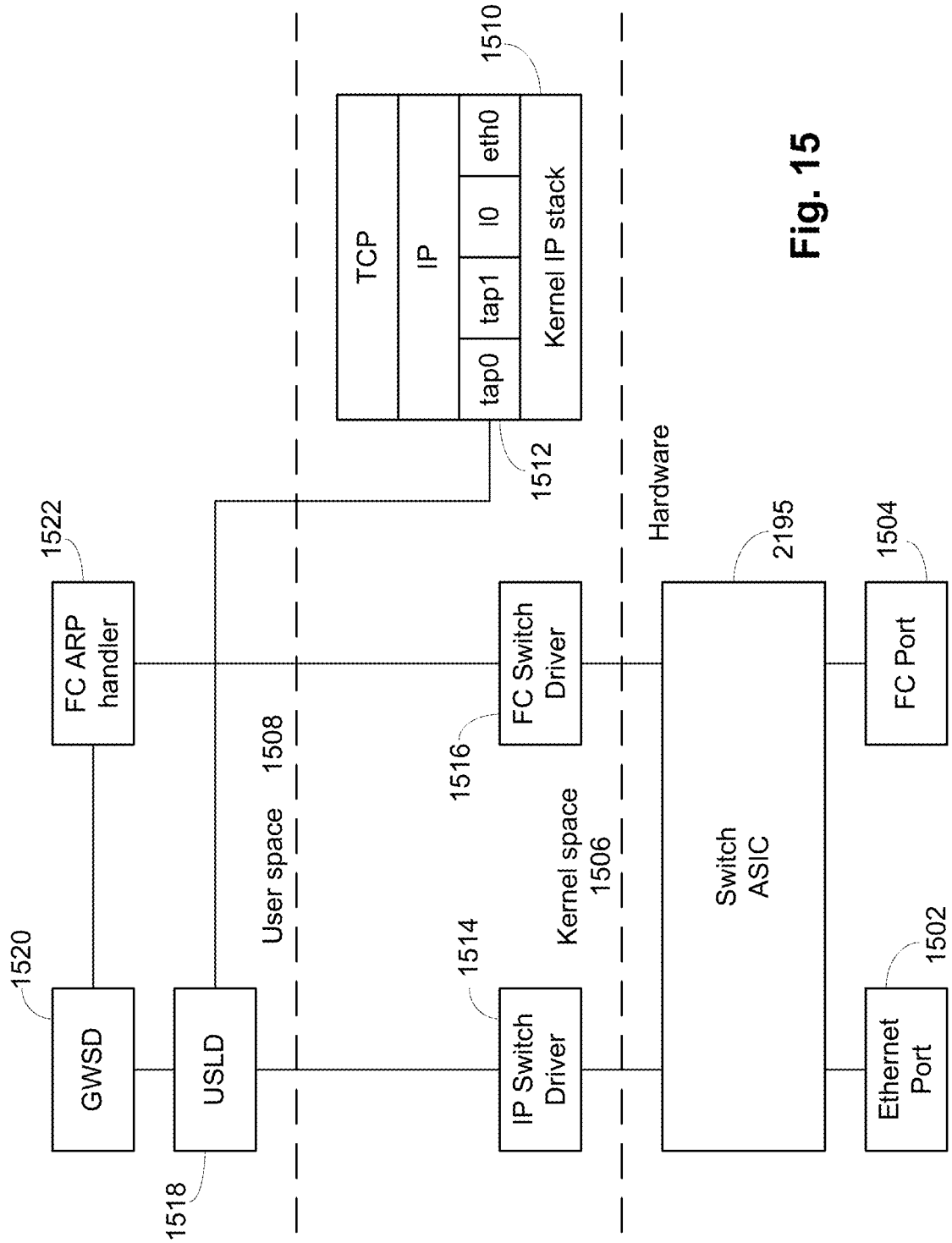
FIG. 15 is a block diagram of hardware and software elements in an ARP mechanism according to the present invention.

FIG. 15 is a block diagram illustrating the hardware and software components in the preferred embodiment for ARP handling. A switch ASIC 2195 is the primary hardware component and is described in more detail below. An Ethernet port 1502 and an FC port 1504 are connected to the switch ASIC 2195 to transmit and receive Ethernet and FC frames. Only one port of each type is shown for purposes of explanation, it being understood that the switch ASIC 2195 will have many more ports in practice. The software environment has two portions, kernel space 1506 and user space 1508. The operating system (generally not shown) resides in kernel space and is preferably Linux. A kernel IP stack 1510 is present for handling IP operations. A tap device 1512 is configured in the kernel IP stack 1510 to allow receipt and injection of Ethernet frames into the IP stack 1510. An IP switch driver 1514 and an FC switch driver 1516 interface to the switch ASIC 2195 to connect the switch ASIC 2195 to the software environment. The IP switch driver 1514 is connected to a Universal Storage layer daemon (USLD) 1518. The USLD 1518 interfaces with the tap device 1512. A Gateway Services daemon (GWSD) 1520 is connected to the USLD 1518 and performs the bulk of the IP-side ARP support. An FC ARP handler 1522 is connected to the FC switch driver 1516 and the GWSD 1520. The FC ARP handler 1522 performs the FC-side ARP support. The connection between the GWSD 1520 and the FC ARP handler 1522 allows transfer between the FC and IP portions of operations.

Figure 16:
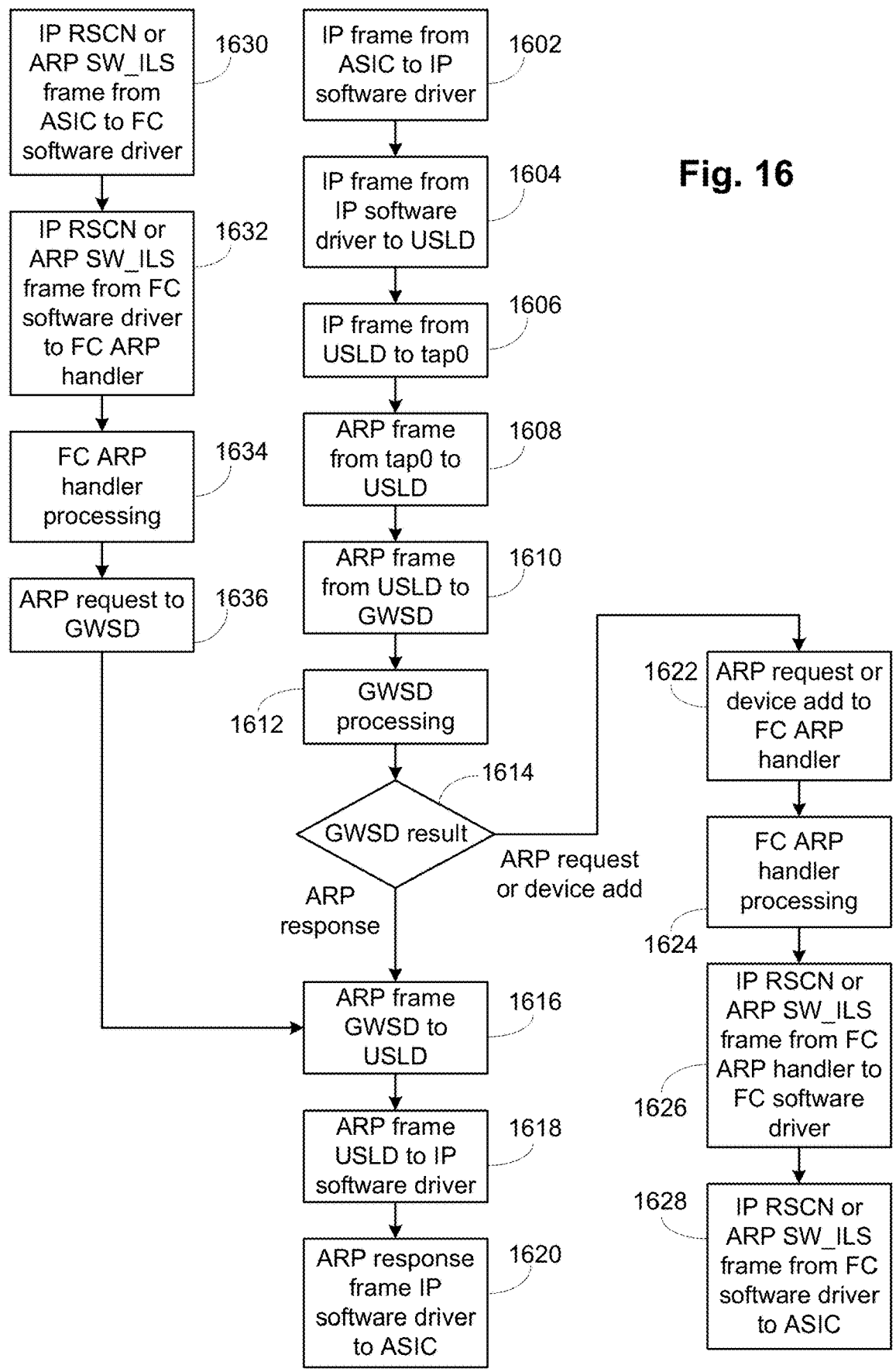
FIG. 16 is a flowchart of the operation of the elements of FIG. 15 in ARP processing according to the present invention.
Figure 17:
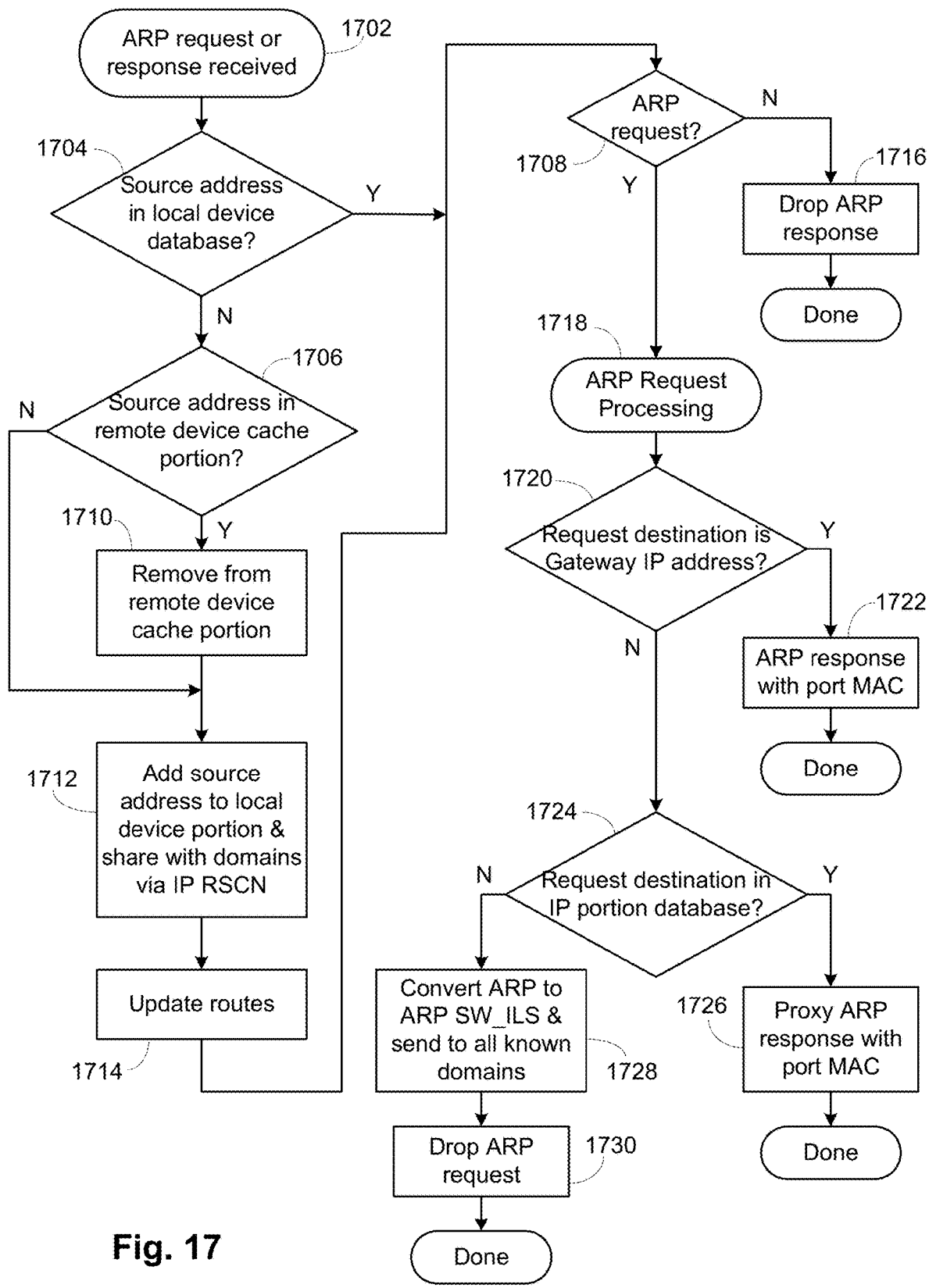
FIG. 17 is a flowchart of operation of a switch in a network according to the present invention upon receipt of an ARP request.

FIG. 16 is a flowchart of the operation and interaction of the various items of FIG. 15 in ARP operations. In step 1602, an IP frame is passed from the switch ASIC 2195 to the IP software driver 1514. In step 1604, the IP switch driver 1514 passes the IP frame to the USLD 1518. In step 1606, the IP frame is passed to the tap device 1512. The tap device 1512 determines that the IP frame is an ARP frame that needs to be handled by the ARP logic, so the ARP frame is passed from the tap device 1512 back to the USLD 1514 in step 1608. In step 1610, the ARP frame is passed to the GWSD 1520 for processing. In step 1612, the GWSD 1520 performs ARP processing on the ARP fame. This ARP processing is shown in FIG. 17 and is described below. The output of the GWSD processing can be an ARP response or an ARP request or device add operation. Step 1614 determines which operation is the result of the GWSD processing.

If the output is an ARP response, as the GWSD 1520 has the necessary IP device information in the name server database 1402, the ARP response frame developed by the GWSD 1520 is provided to the USLD 1518 in step 1616. The ARP response frame is forwarded to the IP switch driver 1514 in step 1618 and to the switch ASIC 2195 in step 1620 for transmission to the device that provided the ARP request.

If the output of the GWSD processing was an ARP request, indicating that the name server database 1402 does not know the requested device, or an add device operation, in step 1622 the operation is provided to the FC ARP handler 1522. It is noted that if the ARP request was from a new IP device and the destination was known, the output of the GWSD processing is both an ARP response and a device add operation, so both paths are performed. In step 1624, the FC ARP handler 1522 processes the ARP requests and device add operations. In this case, the FC ARP handler 1522 processing is to convert the ARP request into an ARP switch fabric internal link service (SW_ILS) frame and the device add operation into an IP registered state change notification (RSCN). The IP RSCN is modified from conventional FC RSCN operation to handle the IP device information, while the ARP SW_ILS is a new SW_ILS. Preferably the IP RSCN is based on the "medium" device entry format enhanced RSCN described in U.S. Pat. No. 8,320,241, which is hereby incorporated by reference. In one embodiment changes for IP RSCN use include providing port type values for Ethernet and IP, utilizing the Initial Process Assoc. field for the MAC value, the Class of Service field for the Node IPv4 IP address, and a portion of the FC-4 Types field for the IPv4 Port address, with other fields converted as needed for additional information to be transferred. Other embodiments can use different mappings. In one embodiment the ARP SW_ILS uses a vendor specific command code value, while in other embodiments different command codes values can be used. The ARP SW_ILS payload preferably includes the received ARP request so that the receiving USF switch can simply use that to transmit the ARP request. Step 1626 provides the IP RSCN or ARP SW_ILS to the FC software driver 1516, which forwards the frames in step 1628 to the switch ASIC 2195 for transmission.

Figure 19:
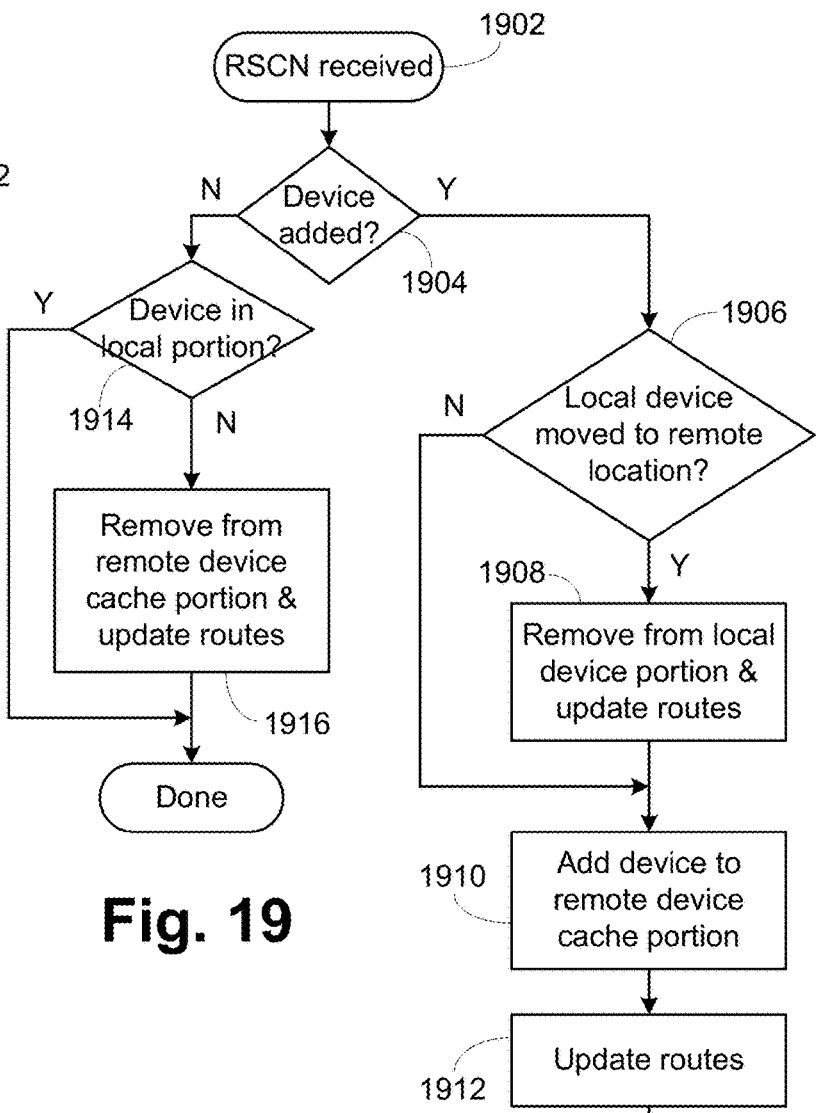
FIG. 19 is a flowchart of operation of a switch in a network according to the present invention when an RSCN is received.
Figure 20:
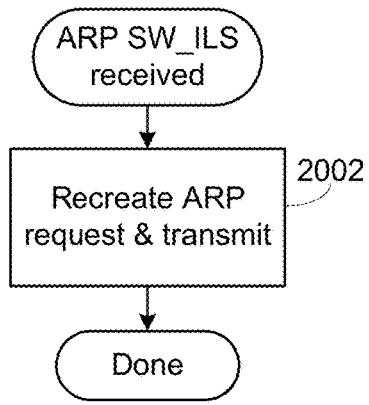
FIG. 20 is a flowchart of operation of a switch in a network according to the present invention when an ARP SW_ILS is received.

In step 1630, an IP RSCN or an ARP SW_ILS is received at the switch ASIC 2195 and provided to the FC software driver 1516. This is the path for IP RSCNs or ARP SW_ILSs provided in step 1628 by other USF switches. The IP RSCN or ARP SW_ILS is provided to the FC ARP handler 1522 in step 1632. The FC ARP handler 1522 processes the frame in step 1634. This processing is shown in FIGS. 19 and 20 and described below. If the received frame is an ARP SW_ILS, the regenerated ARP request is provide in step 1636 to the GWSD 1520 for transmission. The ARP request is forwarded to the USLD 1518 in step 1616.

Referring to FIG. 17, device discovery is triggered when an ARP request or response is received by a USF switch. In addition to normal ARP requests/responses, gratuitous ARP is handled to identify device movement within the USF in a similar manner.

After an ARP event is received in step 1702, before processing the event normally, the local device database portion 1412 and the remote portion 1414 of the database are checked in steps 1704 and 1706, respectively, to determine if the source device already exists in the database. If the source device is present in the local device portion 1412, operation proceeds to step 1708. If the source device is present in the remote device portion 1414, the source device has been moved from another USF switch to the present USF switch, so in step 1710 the device is removed from the remote device portion 1414. If the source device is not present in either the local device portion 1412 or the remote device portion 1414 or after removal from the remote device portion 1414 in step 1710, in step 1712 the source device is added to the local device portion 1412 and this presence is shared with the other USF switches by providing an IP RSCN. In FIG. 16, this is the GWSD 1520 providing a device add operation to the FC ARP handler 1522. In step 1714, the routes inside the USF are updated based on the source device location. After step 1714 operation proceeds to step 1708.

In step 1708 a determination is made whether the ARP frame is an ARP request. If not, it is an ARP response, which in step 1716 is dropped, as the local device portion 1412 has been updated and any necessary IP RSCN has been provided. If the ARP frame is an ARP request, ARP request processing commences at step 1718. In step 1720 it is determined if the destination address is the gateway IP address of the USF. If so, in step 1722 an ARP response is generated with the MAC address of the receiving IP port and the ARP response is transmitted. This is steps 1616, 1618, 1620 of FIG. 16. If not, in step 1724 it is determined if the destination device is present in the IP portion 1406 of the name server database 1402. If the destination device is present, in step 1726 a proxy ARP response is prepared and transmitted, the proxy AARP providing the MAC address of the destination device as retrieved from the IP portion 1406. This is also steps 1616, 1618, 1620 of FIG. 16. If the destination device is not known, in step 1728 the ARP request is converted to a format for an ARP SW_ILS and is sent to all other USF switches. This is steps 1622, 1624, 1626, 1628 of FIG. 16. In step, 1730 the ARP request is dropped as the replacement ARP SW_ILS frames have been provided.

Therefore, GWSD processing adds new local devices to the local device portion 1412, provides the information on the new local device to the other USF switches and either provides an ARP response, when the destination device is known, or an ARP SW_ILS, to propagate the ARP request, when a device is not known.

Figure 18:
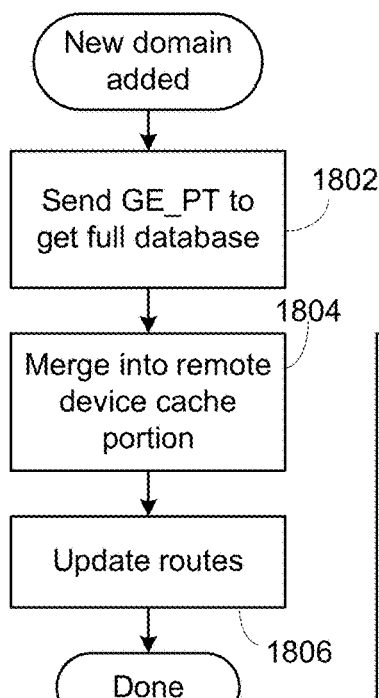
FIG. 18 is a flowchart of operation of a switch in a network according to the present invention when a new domain is added.

Referring to FIG. 18, when a new domain is discovered, a GE_PT (Get Entry based Port Type) name server request is used in step 1802 to retrieve the full database of the newly discovered domain. The received entries are added to the remote portion 1414 of the database in step 1804. In addition, the route table is updated to include all the devices that are listed in the GE_PT response in step 1806.

Referring to FIG. 19, operation of the FC ARP handler 1522 is shown. Once a new domain has established using full discovery with the local domain through GE_PT, additional updates to indicate added or deleted entries on the remote domain come through the IP RSCN process. When an IP RSCN is received 1902 and the device is determined to be an added device in step 1904, the local portion 1412 is checked in step 1906 to see if the device has moved from the local domain to remote domain before a local keep alive was able to detect the device removal. In such case, in step 1908, the local device is removed and routes updated before going through a normal add scenario. If no local device is found, the normal add scenario of step 1910 involves adding the device to the remote portion 1414 of the database and updating routes in step 1912.

When an IP RSCN indicates a device being removed, which would be provided from a different USF switch based on removal detection by software not shown here, which software would generate an IP RSCN indicating removal of the device, the local device portion 1412 is checked in step 1914 to see if the entry already exists. If it does, this indicates that the device has been moved from the remote to local domain and new SA MAC handling took place before keep alive timeout was handled on the remote domain. In such case, no additional handling is needed. Otherwise, in step 1916, the entry is removed from the remote device portion 1414 of the database and the routing is updated.

FIG. 20 is the flowchart of the FC ARP handler 1522 processing of step 1634. In step 2002 the received ARP SW_ILS is converted into a reconstituted form of the originally received ARP request and then the ARP request is transmitted out the Ethernet port(s).

In an alternate embodiment, if the switches are caching remote devices instead of storing all remote devices as generally described above, then a remote device that is still connected and known could be removed from the cache. To avoid sending out the ARP requests, several alternatives are possible. First, each switch receiving the ARP SW_ILS would check its local device database portion for the requested device. If present, then the edge switch would send an RSCN to the originating edge switch to cause the device to be placed back into the remote cache portion. Then there is an option of coordinating with all other switches. In one case, no coordination is done and the other switches send out the ARP requests. If the requested device is already locally connected to a switch, that switch would just ignore the ARP response as the device is already present. If coordination is desired, the switches can communicate with each other the results of the internal lookup. If all switches report not found, then each switch would send out the ARP request, but if any switch reports found, then the ARP requests need not be transmitted.

Figure 21:
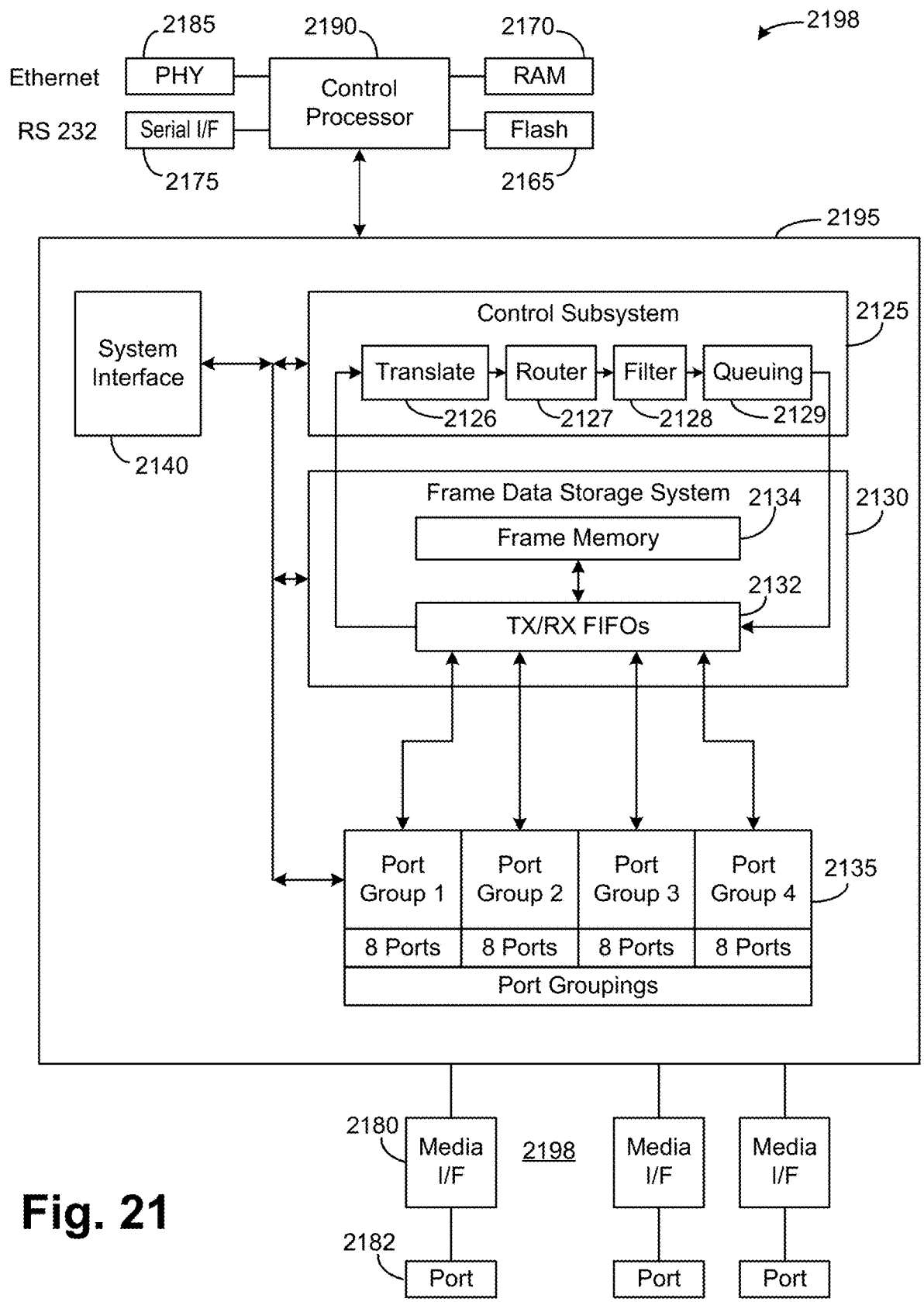
FIG. 21 is a block diagram of an exemplary switch according to the present invention.

FIG. 21 is a block diagram of an exemplary switch 2198. A control processor 2190 is connected to a switch ASIC 2195. The switch ASIC 2195 is connected to media interfaces 2180, which are connected to ports 2182. The media interfaces can be Ethernet or Fibre Channel as desired. Generally, the control processor 2190 configures the switch ASIC 2195 and handles higher-level switch operations, such as the name server, routing table setup, and the like and the ARP operations described above. The switch ASIC 2195 handles general high-speed inline or in-band operations, such as switching, routing and frame translation. The control processor 2190 is connected to flash memory 2165 or the like to hold the software and programs for the higher level switch operations and initialization, such as the operating system, the kernel IP stack 1510, the IP switch driver 1514, the FC switch driver 1516, the USLD 1518, the GWSD 1520 and the FC ARP handler 1522; to random access memory (RAM) 2170 for working memory, such as the name server and route tables; and to an Ethernet PHY 2185 and serial interface 2175 for out-of-band management.

The switch ASIC 2195 has four basic modules, port groups 2135, a frame data storage system 2130, a control subsystem 2125 and a system interface 2140. The port groups 2135 perform the lowest level of packet transmission and reception. In the preferred embodiments, each port in the port groups 2135 can be configured to operate using Ethernet or Fibre Channel. Generally, frames are received from a media interface 2180 and provided to the frame data storage system 2130. Further, frames are received from the frame data storage system 2130 and provided to the media interface 2180 for transmission out of port 2182. The frame data storage system 2130 includes a set of transmit/receive FIFOs 2132, which interface with the port groups 2135, and a frame memory 2134, which stores the received frames and frames to be transmitted. The frame data storage system 2130 provides initial portions of each frame, typically the frame header and a payload header for FCP frames, to the control subsystem 2125. The control subsystem 2125 has the translate 2126, router 2127, filter 2128 and queuing 2129 blocks. The translate block 2126 examines the frame header and performs any necessary address translations, such as those that happen when a frame is redirected as described herein. There can be various embodiments of the translation block 2126, with examples of translation operation provided in U.S. Pat. Nos. 7,752,361 and 7,120,728, both of which are incorporated herein by reference in their entirety. Those examples also provide examples of the control/data path splitting of operations. The router block 2127 examines the frame header and selects the desired output port for the frame. The filter block 2128 examines the frame header, and the payload header in some cases, to determine if the frame should be transmitted. In the preferred embodiment of the present invention, hard zoning is accomplished using the filter block 2128. The queuing block 2129 schedules the frames for transmission based on various factors including quality of service, priority and the like.

Various other patents and patent applications can be referenced to provide additional background for portions of this description. Those patents and applications include U.S. Patent Application Publication Nos. 2011/0299391, 2011/0286357, 2011/0268125, 2011/0299535, 2011/0268120, and 2011/0292947, which describe a VCS architecture where an Ethernet fabric is formed using a TRILL and Ethernet data layer and a combination TRILL and FC control layer, with these applications hereby incorporated by reference. An Ethernet Name Server (eNS) distribution service, which is used to maintain coherency of information among the various RBridges (RBs) is discussed in Publication No. 2011/0299535 incorporated above, to notify all other RBs of link establishment, status, etc. In addition, U.S. Patent Application Publication Nos. 2014/0269745, 2014/0301402 provide details of using an Ethernet fabric to connect FCoE hosts to other FCoE hosts and to an FC switch or an FCF. Both applications are hereby incorporated by reference.

Embodiments according to the present invention provide a Universal Storage Fabric, allowing FC and Ethernet storage devices to be connected to a single fabric that has the properties of an FC fabric. IP services such as ARP are provided, with messaging between the USF switches to propagate ARP requests as needed and to keep all USF switches updated on connected IP devices.

The above description is intended to be illustrative, and not restrictive. For example, the above-described embodiments may be used in combination with each other. Many other embodiments will be apparent to those of skill in the art upon reviewing the above description. The scope of the invention should, therefore, be determined with reference to the appended claims, along with the full scope of equivalents to which such claims are entitled. In the appended claims, the terms "including" and "in which" are used as the plain-English equivalents of the respective terms "comprising" and "wherein."

The invention claimed is:

1. A network comprising:
   a plurality of switches which interconnect via Fibre Channel links to form a Fibre Channel fabric for internal communications, with at least some of the plurality of switches being edge switches which have external facing ports which provide Ethernet connections for Ethernet packets, each edge switch encapsulating received Ethernet packets in Fibre Channel packets for internal communication,
   wherein each edge switch maintains a database of all locally connected Ethernet Internet Protocol (IP) devices and at least some remotely connected Ethernet IP devices,
   wherein each edge switch maintains said database based on received Address Resolution Protocol (ARP) requests and responses and registered state change notification (RSCNs) provided by other edge switches,
   wherein each edge switch provides a Fibre Channel (FC) ARP switch fabric internal link service (SW_ILS) to each other edge switch upon receipt of an ARP request that cannot be responded to based on device information maintained on the receiving edge switch, wherein the ARP SW_ILS includes sufficient information to allow the ARP request to be reconstructed, and wherein each edge switch receiving an ARP SW_ILS provides an ARP request equivalent to the received ARP request based on the ARP SW_ILS to all locally connected Ethernet IP devices.

2. The network of claim 1, wherein all remotely connected Ethernet IP devices are maintained in said database.

3. A switch comprising:

a processor;

a memory coupled to said processor and storing software executed by said processor and a database of all locally connected Ethernet IP devices and at least some remotely connected Internet Protocol (IP) devices;

at least one Fibre Channel port for connection to a plurality of similar switches via at least one Fibre Channel link, the combined switches forming a Fibre Channel fabric for communication among the switches; and at least one Ethernet port for connection to external Ethernet IP devices; and internal switching logic coupled to said processor, said at least one Fibre Channel port and said at least one Ethernet port for encapsulating Ethernet packets received at said at least one Ethernet port in Fibre Channel packets for forwarding to one or more of the plurality of similar switches via the at least one Fibre Channel link, wherein each edge switch maintains said database based on received Address Resolution Protocol (ARP) requests and responses and registered state change notification (RSCNs) provided by other edge switches, wherein each edge switch provides a Fibre Channel (FC) ARP switch fabric internal link service (SW_ILS) to each other edge switch upon receipt of an ARP request that cannot be responded to based on device information maintained on the receiving edge switch, wherein the ARP SW_ILS includes sufficient information to allow the ARP request to be reconstructed, and wherein each edge switch receiving an ARP SW_ILS provides an ARP request equivalent to the received ARP request based on the ARP SW_ILS to all locally connected Ethernet IP devices.

4. The network of claim 3, wherein all remotely connected Ethernet IP devices are maintained in said database.

5. The switch of claim 3, wherein the database includes all locally connected Fibre Channel devices and at least some remotely connected Fibre Channel devices.

6. The switch of claim 3, wherein the internal switching logic is configured to encapsulate all Ethernet packets received at said at least one Ethernet port in Fibre Channel packets for forwarding to one or more of the plurality of similar switches via the at least one Fibre Channel link.

7. The switch of claim 3, wherein the processor is configured to add an entry to the database in response to a registered state change notification (RSCN) received from one of the plurality of similar switches via the at least one Fibre Channel port.

8. A method of operating a network comprising:

each edge switch of a plurality of switches which interconnect via Fibre Channel links to form a Fibre Channel fabric for internal communications, with at least some of the plurality of switches being edge switches which have external facing ports which provide Ethernet connections for Ethernet packets, each edge switch encapsulating received Ethernet packets in Fibre Channel packets for internal communication, maintaining a database of all locally connected Ethernet Internet Protocol (IP) devices and at least some remotely connected Ethernet IP devices, wherein each edge switch maintains said database based on received Address Resolution Protocol (ARP) requests and responses and registered state change notification (RSCNs) provided by other edge switches, wherein each edge switch provides a Fibre Channel (FC) ARP switch fabric internal link service (SW_ILS) to each other edge switch upon receipt of an ARP request that cannot be responded to based on device information maintained on the receiving edge switch, wherein the ARP SW_ILS includes sufficient information to allow the ARP request to be reconstructed, and wherein each edge switch receiving an ARP SW_ILS provides an ARP request equivalent to the received ARP request based on the ARP SW_ILS to all locally connected Ethernet IP devices.

9. The method of claim 8, wherein all remotely connected Ethernet IP devices are maintained in said database.

10. A method of operating a switch comprising:

maintaining, by a switch having a processor; a memory coupled to said processor and storing software executed by said processor, having at least one Fibre Channel port for connection to a plurality of similar switches via at least one Fibre Channel link, the combined switches forming a Fibre Channel fabric for communication among the switches; at least one Ethernet port for connection to external Ethernet IP devices; internal switching logic coupled to said processor, said at least one Fibre Channel port and said at least one Ethernet port for encapsulating Ethernet packets received at said at least one Ethernet port in Fibre Channel packets for forwarding to one or more of the plurality of similar switches via the at least one Fibre Channel link, and a database of all locally connected Ethernet IP devices and at least some remotely connected Internet Protocol (IP) devices, wherein each edge switch maintains said database based on received Address Resolution Protocol (ARP) requests and responses and registered state change notification (RSCNs) provided by other edge switches, wherein each edge switch provides a Fibre Channel (FC) ARP switch fabric internal link service (SW_ILS) to each other edge switch upon receipt of an ARP request that cannot be responded to based on device information maintained on the receiving edge switch, wherein the ARP SW_ILS includes sufficient information to allow the ARP request to be reconstructed, and wherein each edge switch receiving an ARP SW_ILS provides an ARP request equivalent to the received ARP request based on the ARP SW_ILS to all locally connected Ethernet IP devices.

11. The method of claim 10, wherein all remotely connected Ethernet IP devices are maintained in said database.

\* \* \* \* \*